United States Patent
Lo et al.

(10) Patent No.: US 7,986,694 B2
(45) Date of Patent: Jul. 26, 2011

(54) METHOD FOR FRAGMENTING AN INCOMING PACKET INTO A FIRST OUTGOING PACKET AND A SECOND OUTGOING PACKET

(75) Inventors: Yung-Chieh Lo, Miao-Li (TW); James Lin, Tai-Chung Hsien (TW); Yu-Zuong Chou, Taipei (TW); Chun-Feng Liu, Taipei (TW); Cheng-Hung Wu, Tao-Yuan Hsien (TW)

(73) Assignee: Realtek Semiconductor Corp., Hsin-Chu Hsien (TW)

( * ) Notice: Subject to any disclaimer, the term of this patent is extended or adjusted under 35 U.S.C. 154(b) by 2272 days.

(21) Appl. No.: 10/708,027

(22) Filed: Feb. 3, 2004

(65) Prior Publication Data

US 2005/0169272 A1    Aug. 4, 2005

(51) Int. Cl.
*H04L 12/28*    (2006.01)
(52) U.S. Cl. ................................. 370/392; 370/428
(58) Field of Classification Search .............. None
See application file for complete search history.

(56) References Cited

U.S. PATENT DOCUMENTS

| | | | | |
|---|---|---|---|---|
| 6,212,546 B1 * | 4/2001 | Starkovich et al. | ............ | 709/203 |
| 7,050,437 B2 * | 5/2006 | Bilic et al. | ............ | 370/394 |
| 7,054,322 B2 * | 5/2006 | D'Annunzio et al. | ............ | 370/401 |
| 7,088,737 B1 * | 8/2006 | Carrel | ............ | 370/469 |
| 7,206,310 B1 * | 4/2007 | Chen et al. | ............ | 370/389 |
| 7,249,194 B2 * | 7/2007 | Suzuki et al. | ............ | 709/238 |
| 7,460,536 B1 * | 12/2008 | Williams et al. | ............ | 370/392 |
| 2001/0036185 A1 * | 11/2001 | Dempo | ............ | 370/392 |
| 2002/0010866 A1 | 1/2002 | McCullough | | |
| 2002/0147826 A1 | 10/2002 | Sultan | | |
| 2002/0150100 A1 | 10/2002 | White | | |
| 2002/0176414 A1 * | 11/2002 | Miki et al. | ............ | 370/389 |
| 2003/0037163 A1 * | 2/2003 | Kitada et al. | ............ | 709/236 |
| 2003/0065799 A1 * | 4/2003 | Kitamura | ............ | 709/230 |
| 2004/0052257 A1 * | 3/2004 | Abdo et al. | ............ | 370/392 |
| 2005/0220097 A1 * | 10/2005 | Swami et al. | ............ | 370/389 |

OTHER PUBLICATIONS

Saitoh, A. Masuda, H., A transparent session migration and transparent fail-over protocol for PPPoE server cluster, 2004, IEEE, International Symposium on Applications and the Internet, 2004. Proceedings. pp. 255-261.*

Mamakos, et al. "A Method for Transmitting PPP Over Ethernet (PPPoE)." Feb. 1999, pp. 1-18.

* cited by examiner

*Primary Examiner* — Jayanti K Patel
*Assistant Examiner* — Hooman Houshmand
(74) *Attorney, Agent, or Firm* — Thomas, Kayden, Horstemeyer & Risley, LLP (57) ABSTRACT

A method for fragmenting an incoming packet for transmission as a first outgoing packet and a second outgoing packet includes storing a payload of the incoming packet in a plurality of storage units beginning in a first storage unit, transmitting the first outgoing packet being formed according to a predetermined portion of the payload stored in the first storage unit, and after transmitting the first outgoing packet, transmitting the second outgoing packet being formed according to a remaining portion of the payload stored in the storage units.

23 Claims, 6 Drawing Sheets

METHOD FOR FRAGMENTING AN INCOMING PACKET INTO A FIRST OUTGOING PACKET AND A SECOND OUTGOING PACKET

BACKGROUND OF INVENTION

1. Field of the Invention

The invention relates to data communications, and more particularly, to fragmenting an incoming packet for inclusion in a first outgoing packet and a second outgoing packet.

2. Description of the Prior Art

As stated in Requests for Comments (RFC) document number 2516, which is incorporated herein by reference, modern access technologies are faced with several conflicting goals. It is desirable to connect multiple hosts at a remote site through the same customer premise access device. It is also a goal to provide access control and billing functionality in a manner similar to dial-up services using Point to Point Protocol (PPP).

Figure 1:
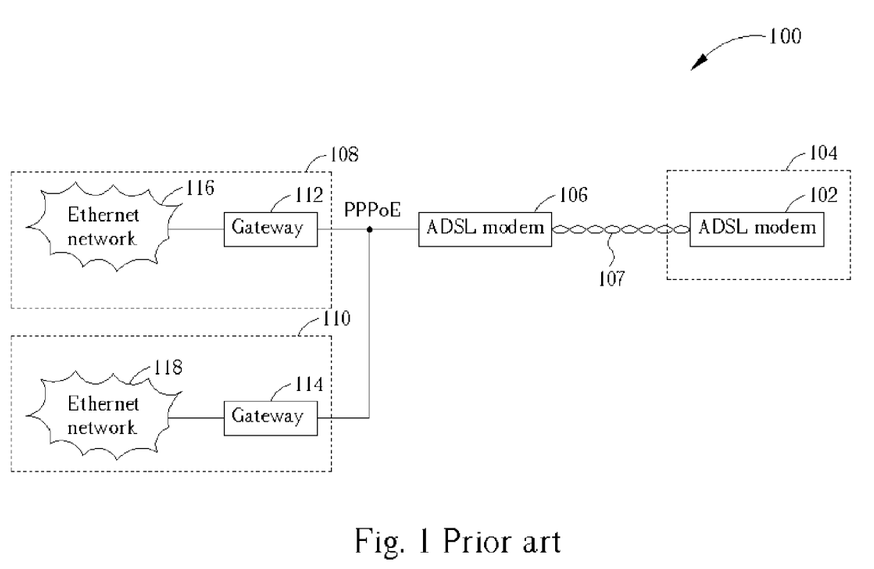
FIG. 1 is a diagram showing a typical distribution of ADSL broadband access to multiple hosts through a single customer premise access device.

FIG. 1 shows a typical distribution of Asynchronous Digital Subscriber Line (ADSL) broadband access to multiple hosts through a single customer premise access device. An ADSL modem 102 of a service provider 104 is connected to a client-side ADSL modem 106 at a particular location through a telephone connection 107, which is typically implemented as twisted pair telephone wire. As an example, FIG. 1 shows that the particular location has two separate customers. A first customer 108 and a second customer 110 both receive broadband connectivity from the client-side ADSL modem 106. The client-side ADSL modem 106 is a single customer premise access device, which provides access to the first customer 108 through a first gateway 112 and to the second customer 110 through a second gateway 114. The first customer 108 has an internal Ethernet network 116, and the second customer 110 has an internal Ethernet network 118.

By using Point to Point Protocol over Ethernet (PPPoE) between the client-side ADSL modem 106 and the first and second gateways 112, 114, the service provider 104 is able to do access control, billing, and type of service adjustments on a per-customer, rather than a per-location, basis. However, the PPPoE connection between the client-side ADSL modem 106 and the first and second gateways 112, 114 also increases the complexity of the distribution system 100. For example, the Maximum Receive Unit (MRU) negotiated by the PPP-LCP (Link Control Protocol) in the client-side ADSL modem 106 is typically 1492 bytes, while the Maximum Transmit Unit for the first and second Ethernet networks is typical 1500 bytes. Because of this, when transmitting packets, such as Internet Protocol (IP) packets, from the customer Ethernet networks 116, 118 to the service provider 104, packet fragmentation is required.

Figure 2:
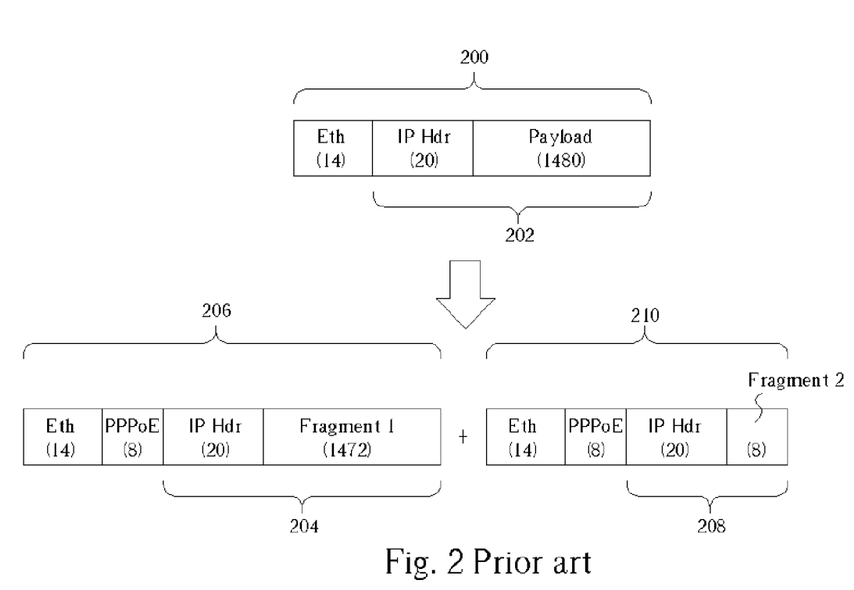
FIG. 2 is an example of IP packet fragmentation performed at the first gateway in FIG. 1 according to the prior art.

FIG. 2 shows an example of IP packet fragmentation performed at the first gateway 112 according to the prior art. Please note that the IP packet fragmentation operation performed at the second gateway 114 is the same as that described in FIG. 2. An incoming Ethernet frame 200 includes a 14-byte Ethernet header, and a 1500-byte Ethernet payload comprising an incoming IP packet 202. The IP packet 202 includes a 20-byte IP header and a 1480-byte payload. As shown in FIG. 2, the incoming IP packet 202 is fragmented by the gateway 112 into a first outgoing IP packet 204 and a second outgoing IP packet 208. The first outgoing IP packet 204 includes a 20-byte first outgoing IP header and a 1472-byte first IP fragment, and is included in a first outgoing PPPoE frame 206, which additionally includes a 14-byte Ethernet header and an 8-byte PPPoE header. The second outgoing IP packet 208 includes a 20-byte second outgoing IP header and an 8-byte second IP fragment, and is included in a second outgoing PPPoE frame 208, which additionally includes a 14-byte Ethernet header and an 8-byte PPPoE header. As shown in FIG. 2, to make room for the 8-byte PPPoE header, the 1480-byte incoming IP payload is fragmented into the 1472-byte first outgoing IP fragment and the 8-byte second outgoing IP fragment.

Figure 3:
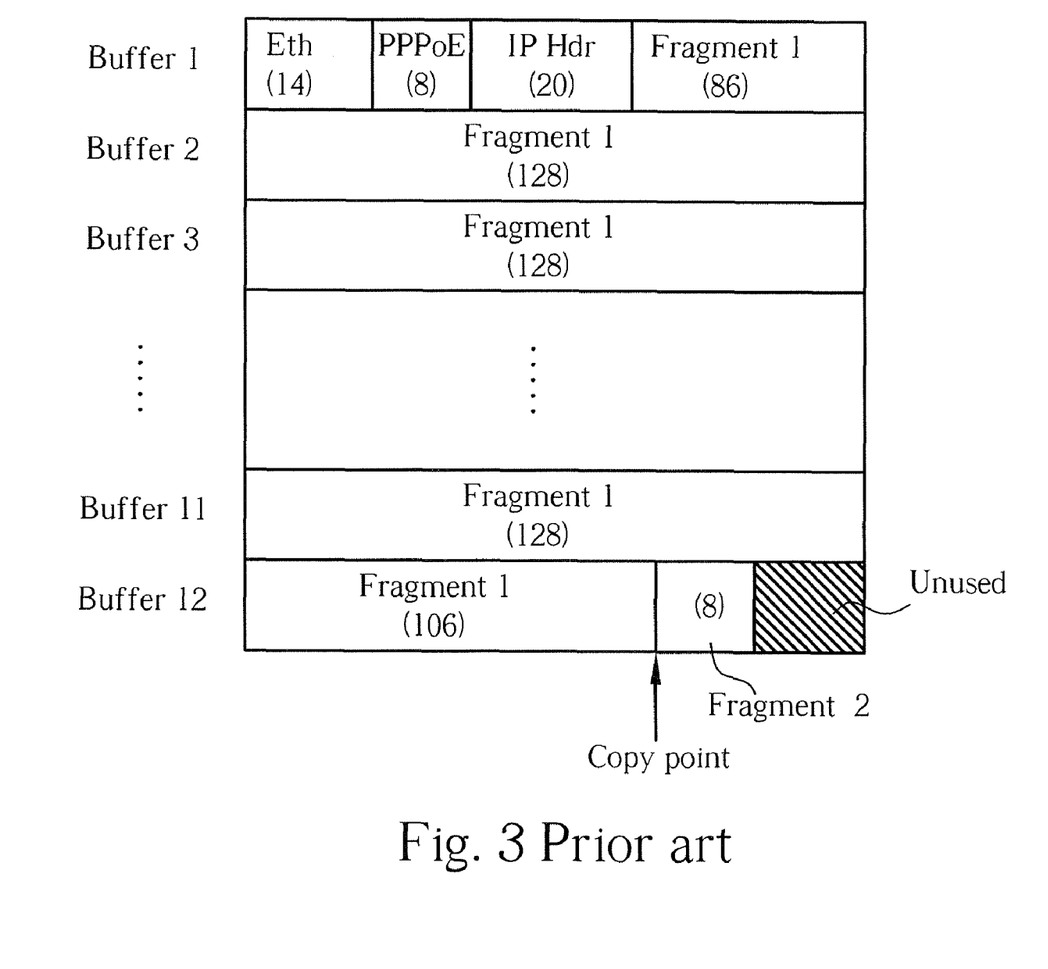
FIG. 3 is a diagram showing the usage of a plurality of buffers internal to the gateway of FIG. 1 when fragmenting an incoming IP packet as shown in FIG. 2.

FIG. 3 shows the usage of a plurality of buffers internal to the gateway 112 when fragmenting an incoming IP packet as shown in FIG. 2. As an example, FIG. 3 shows twelve buffers (Buffer 1 to Buffer 12), wherein each buffer provides 128-bytes of data storage. A 14-byte outgoing Ethernet header (Eth) and an 8-byte PPPoE header for the first outgoing PPPoE frame 206 are generated and stored in Buffer 1. Additionally, as well known to a person skilled in the art, the original 20-byte IP header has the MF, Offset, Length, and Checksum fields modified in accordance with the first fragment (Fragment 1), which is stored starting in the last 86-bytes of Buffer 1 through to the first 106-bytes of Buffer 12. When transmitting the first outgoing PPPoE frame 206 and the second outgoing PPPoE frame 210, the gateway 112 transmits the data in the buffers in order from Buffer 1 to Buffer 12. When reaching the last 8 bytes (Fragment 2 as indicated by the Copy point in FIG. 3) the gateway 112 needs to generate a new Ethernet header and PPPoE header. Additionally, the IP header stored in Buffer 1 needs to have the MF, Offset, Length, and Checksum fields of the IP header stored in Buffer 1 modified in accordance with the last 8-bytes (Fragment 2). Afterwards, the new Ethernet header, the new PPPoE header, the modified IP header, and Fragment 2 are transmitted as the second outgoing PPPoE frame. At this point, the gateway 112 no longer needs the information stored in Buffers 1 to 12 and these buffers can be freed for use in storing a next incoming packet or for use in another task. In other words, the IP header in Buffer 1 must be preserved until after the second outgoing PPPoE frame is sent. As such, the method of fragmentation according to the prior art involves inefficient use of the available gateway 112 buffer resources.

SUMMARY OF INVENTION

One objective of the claimed invention is therefore to provide a more efficient method for fragmenting an incoming packet for transmission as a first outgoing packet and a second outgoing packet, to solve the above-mentioned problems.

According to the claimed invention, a method is disclosed for fragmenting an incoming packet for transmission as a first outgoing packet and a second outgoing packet. The method comprises: storing a payload of the incoming packet in a plurality of storage units beginning in a first storage unit, transmitting the first outgoing packet being formed according to a predetermined portion of the payload stored in the first storage unit, and after transmitting the first outgoing packet, transmitting the second outgoing packet being formed according to a remaining portion of the payload stored in the storage units.

Also according to the claimed invention, a method is disclosed for fragmenting an incoming packet for inclusion in a first outgoing packet and a second outgoing packet. The method comprises: storing a payload of the incoming packet as a first fragment and a second fragment in a plurality of storage units, wherein the first fragment is stored within a single storage unit; including the first fragment in the first outgoing packet; and after including the first fragment in the first outgoing packet, including the second fragment in the second outgoing packet.

Also according to the claimed invention, a method is disclosed for fragmenting an IP packet for transmission as first and second PPPoE frames. The method comprises: storing a payload of the IP packet as a first fragment and a second fragment in a plurality of storage means, wherein the first fragment is stored within a single storage unit; transmitting the first PPPoE frame having a payload including the first fragment; and after transmitting the first PPPoE frame, transmitting the second PPPoE frame having a payload including the second fragment.

These and other objectives of the claimed invention will no doubt become obvious to those of ordinary skill in the art after reading the following detailed description of the preferred embodiment that is illustrated in the various figures and drawings.

DETAILED DESCRIPTION

Figure 4:
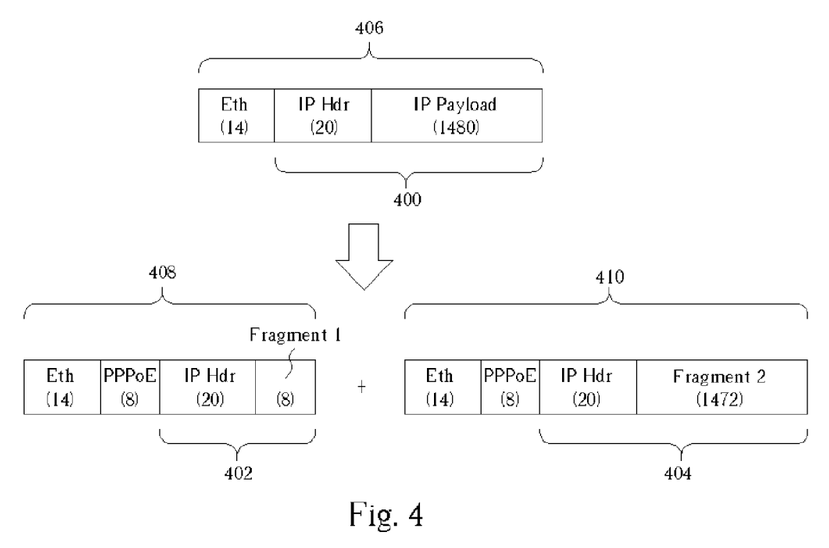
FIG. 4 is an example of packet fragmentation of an incoming IP packet into a first outgoing IP packet and a second outgoing IP packet according to a first embodiment of the present invention.

FIG. 4 shows packet fragmentation of an incoming IP packet 400 into a first outgoing IP packet 402 and a second outgoing IP packet 404 according to a first embodiment of the present invention. An incoming Ethernet frame 406 includes a 14-byte Ethernet header, and a 1500-byte Ethernet payload comprising the incoming IP packet 400. The IP packet 400 includes a 20-byte IP header and a 1480-byte IP payload. As shown in FIG. 4, the incoming IP packet 400 is fragmented into the first outgoing IP packet 402 and a second outgoing IP packet 404. The first outgoing IP packet 402 includes a 20-byte first outgoing IP sub-header and an 8-byte first fragment. The first outgoing IP packet 402 is included in a first outgoing PPPoE frame 408, which additionally includes a 14-byte Ethernet header and an 8-byte PPPoE header. The second outgoing IP packet 404 includes a 20-byte second outgoing IP sub-header and a 1472-byte second fragment. The second outgoing IP packet 44 is included in a second outgoing PPPoE frame 410, which also includes a 14-byte Ethernet header and an 8-byte PPPoE header. As shown in FIG. 4, to make room for the 8-byte PPPoE header, the 1480-byte incoming IP payload is fragmented into the 8-byte first outgoing fragment and the 1472-byte second outgoing IP fragment, which are transmit in that order.

Figure 5:
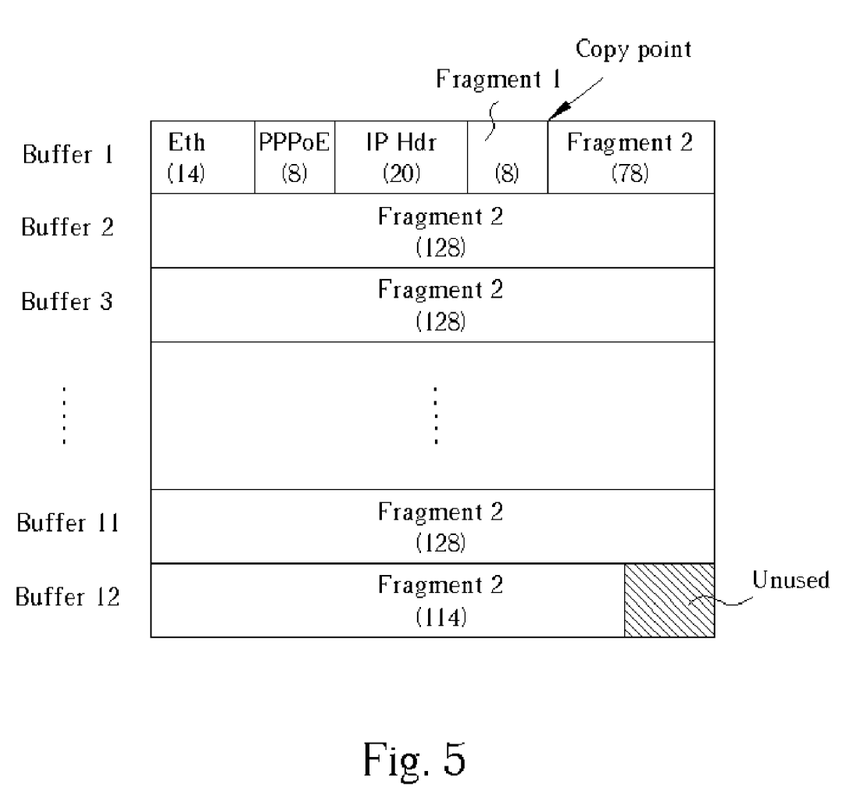
FIG. 5 is a diagram showing the usage of a plurality of buffers internal to a gateway, such as the gateway shown in FIG. 1, that are used to fragment the incoming IP packet shown in FIG. 4.

FIG. 5 shows the usage of a plurality of buffers internal to a gateway, such as the gateway 112 shown in FIG. 1, which are used when fragmenting the incoming IP packet according to the present invention. A 14-byte outgoing Ethernet header (Eth) and an 8-byte PPPoE header for the first outgoing PPPoE frame 408 are generated and stored in Buffer 1. The original 20-byte IP header of the incoming IP packet 400 has the MF, Offset, Length, and Checksum fields modified in accordance with the 8-bytes of the first fragment (Fragment 1), which are stored in the first buffer. After transmitting the first outgoing PPPoE frame 408 (i.e. at the Copy point in FIG. 5), a new Ethernet header and a new PPPoE header are generated for the second outgoing PPPoE frame 410. Additionally, the first outgoing IP sub-header stored in the first buffer needs to have the MF, Offset, Length, and Checksum fields modified in accordance with the remaining 1472-bytes stored in Buffers 1 to 12 as Fragment 2. The new Ethernet header, the new PPPoE header, the second outgoing IP sub-header, and the first 78-bytes of Fragment 2 are transmitted as the beginning of the second outgoing PPPoE frame 410. At this point, the information stored in the first buffer (Buffer 1) is no longer needed and can be freed for use in storing a next incoming packet. Continuing, the next 128-bytes of Fragment 2 stored in the second buffer (Buffer 2) are transmitted. As soon as the data in the second buffer (Buffer 2) has been transmitted, Buffer 2 can be freed for use. This process continues for the remaining buffers (Buffer 3 to Buffer 12) with each buffer being freed immediately after having its data transmitted. This is more efficient than the prior art, which requires the information in all the buffers to be stored until the data in the last buffer has been transmitted.

Figure 6:
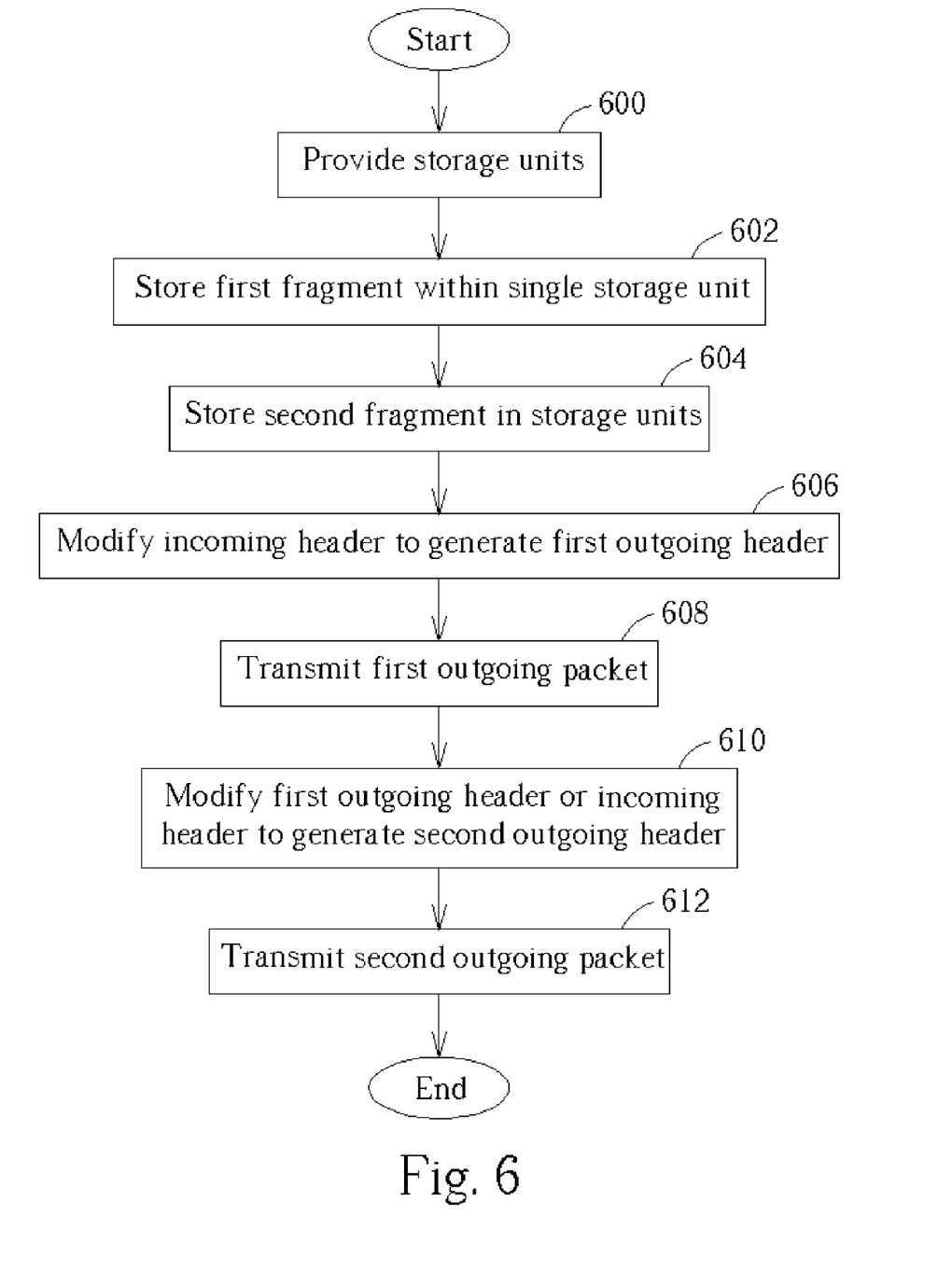
FIG. 6 is a flowchart describing a general method of fragmenting an incoming packet for transmission as a first outgoing packet and a second outgoing packet according to the present invention.

It should be noted that packet types other than IP packets can also benefit from the more efficient packet fragmenting method according to the present invention. The present invention can be used to fragment any incoming packet into a first outgoing packet and a second outgoing packet. Furthermore, although FIG. 5 shows twelve buffers (Buffer 1 to Buffer 12), wherein each buffer provides 128-bytes of data storage, it should be noted that the present invention is not limited to the use of twelve 128-byte buffers. Other memory storage devices such as memory words are also acceptable. Additionally, storage unit sizes other than 128-bytes are also acceptable. As such, FIG. 6 shows a flowchart describing a general method of fragmenting an incoming packet for transmission as a first outgoing packet and a second outgoing packet according to the present invention. The flowchart contains the following steps:

Step 600: Provide a plurality of storage units. The storage units can be buffers, as shown in FIG. 5, or can be other storage devices such as the data words of a memory or another device providing a similar storage function.

Step 602: Store a first fragment of a payload of the incoming packet entirely into a single storage unit. Please note, it is not required that the first fragment completely fill the first storage unit. The requirement of the present invention is that the first fragment does not span across multiple storage units. In one embodiment, if the storage units are buffers as shown in FIG. 5, this means the first fragment is stored entirely within a single buffer and does not span across multiple buffers. In another embodiment, if the storage units are the words of a memory, the first fragment is stored entirely within a single memory word.

Step 604: Store the remaining payload of the incoming packet as a second fragment in the storage units.

Step 606: Modify a header of the incoming packet according to the first fragment to generate a first outgoing sub-header that corresponds to the first fragment.

Step 608: Transmit the first outgoing packet, which is formed by the first outgoing sub-header and the first fragment.

Step 610: Modify either the header of the incoming packet or the first outgoing sub-header according to the second fragment to generate a second outgoing sub-header that corresponds to the second fragment.

Step 612: Transmit the second outgoing packet, which is formed by the second outgoing sub-header and the second fragment.

It should be noted that the first outgoing packet (step 608) is transmitted before the second outgoing packet (step 612). Additionally, as soon as all the data in the first storage element has been transmitted, the original header of the incoming packet, the first outgoing sub-header, and the second outgoing sub-header are no longer required to be stored. For this reason, the first storage unit can be freed for other uses. Likewise, as soon as the data in each of the subsequent storage units has been transmitted, they too can be freed. This is more efficient than the prior art, which requires the information in all the storage units to be preserved until the data in the last buffer has been transmitted.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for fragmenting an incoming packet for transmission as a first outgoing packet and a second outgoing packet, the method comprising:
   storing within computer memory of a gateway device a payload of the incoming packet in a plurality of storage units beginning in a first storage unit, wherein a size of the incoming packet exceeds a maximum packet size for a network connection;
   the gateway device transmitting on the network connection the first outgoing packet being formed according to a predetermined portion of the payload stored in the first storage unit; and
   after transmitting the first outgoing packet, the gateway device transmitting on the network connection the second outgoing packet being formed according to a remaining portion of the payload stored in the storage units;
   wherein the remaining portion corresponds to a majority of the payload of the incoming packet.

2. The method of claim 1, wherein the first and second outgoing packets are Point-to-Point Protocol over Ethernet (PPPoE) frames.

3. The method of claim 1, further comprising:
   generating a first outgoing sub-header according to a header of the incoming packet and the predetermined portion of the payload stored in the first storage unit;
   generating a second outgoing sub-header according to the header of the incoming packet or the first outgoing sub-header, and the remaining portion of the payload;
   including the first outgoing sub-header and the predetermined portion of the payload stored in the first storage unit in the first outgoing packet; and
   including the second outgoing sub-header and the remaining portion of the payload stored in the storage units in the second outgoing packet.

4. The method of claim 3, wherein the incoming packet is an Internet Protocol (IP) packet and the header of the incoming packet is the IP header of the incoming IP packet.

5. The method of claim 4, wherein the first outgoing sub-header is a first IP header corresponding to the predetermined portion of the payload stored in the first storage unit and the incoming IP header, and the second outgoing sub-header is a second IP header corresponding to the remaining portion of the payload, and the incoming IP header or the first outgoing sub-header.

6. The method of claim 4, wherein generating the first outgoing sub-header comprises modifying the MF, Offset, Length, and Checksum fields of the incoming IP header according to the predetermined portion of the payload stored in the first storage unit.

7. The method of claim 4, wherein generating the second outgoing sub-header comprises modifying the MF, Offset, Length, and Checksum fields of the incoming packet IP header or the first outgoing sub-header according to the remaining portion of the payload stored in the storage units.

8. The method of claim 3, wherein the first outgoing sub-header and the first fragment are included as a first outgoing payload of the first outgoing packet, and wherein the second outgoing sub-header and the second fragment are included as a second outgoing payload of the second outgoing packet.

9. The method of claim 1, wherein the first outgoing packet is stored in a single storage unit of the computer memory of the gateway device and the second outgoing packet is stored in a plurality of storage units of the computer memory of the gateway device, wherein as soon as all data stored in a respective storage unit is transmitted, the respective storage unit is freed for other uses by the gateway device.

10. A method for fragmenting an incoming packet for inclusion in a first outgoing packet and a second outgoing packet, the method comprising:
    storing a payload of the incoming packet as a first fragment and a second fragment in a plurality of storage units within computer memory of a gateway device, wherein a size of the incoming packet exceeds a maximum packet size for a network connection;
    the gateway device including the first fragment in the first outgoing packet; and
    after including the first fragment in the first outgoing packet, the gateway device including the second fragment in the second outgoing packet;
    wherein the second fragment corresponds to a majority of the payload of the incoming packet.

11. The method of claim 10, wherein the incoming packet is an Internet Protocol (IP) packet received in an Ethernet frame and the first and second outgoing packets are Point-to-Point Protocol over Ethernet (PPPoE) frames.

12. The method of claim 10 further comprising:
    generating a first outgoing sub-header and a second outgoing sub-header according to the first fragment, the second fragment, and a header of the incoming packet;
    including the first outgoing sub-header in the first outgoing packet; and including the second outgoing sub-header in the second outgoing packet.

13. The method of claim 12, wherein the incoming packet is an incoming Internet Protocol (IP) packet and the header of the incoming packet is the IP header of the incoming IP packet.

14. The method of claim 13, wherein the first outgoing sub-header is a first outgoing IP header generated corresponding to the first fragment and the IP header of the incoming IP packet, and the second outgoing sub-header is a second outgoing IP header generated corresponding to the second fragment, and the IP header of the incoming IP packet or the first outgoing sub-header.

15. The method of claim 13, wherein generating the first outgoing sub-header comprises modifying the MF, Offset, Length, and Checksum fields of the incoming packet IP header according to the first fragment.

16. The method of claim 13, wherein generating the second outgoing sub-header comprises modifying the MF, Offset, Length, and Checksum fields of the incoming packet IP header or the first outgoing sub-header according to the second fragment.

17. The method of claim 12, wherein the first outgoing sub-header and the first fragment are included in a payload of the first outgoing packet, and wherein the second outgoing sub-header and the second fragment are included in a payload of the second outgoing packet.

18. The method of claim 10, wherein the first outgoing packet is stored in a single storage unit of the computer memory of the gateway device and the second outgoing packet is stored in a plurality of storage units of the computer memory of the gateway device, wherein as soon as all data stored in a respective storage unit is transmitted, the respective storage unit is freed for other uses by the gateway device.

19. A method for fragmenting an incoming packet for transmission as first and second outgoing packets, the method comprising:
 storing payload of the incoming packet in a storage unit within computer memory of a gateway device, wherein a size of the incoming packet exceeds a maximum packet size for a network connection;
 the gateway device transmitting the first outgoing packet being formed according to a predetermined portion of the payload stored in the storage unit; and
 after transmitting the first outgoing packet, the gateway device transmitting the second outgoing packet being formed according to a remaining portion of the payload stored in the storage unit;
 wherein the size of the second outgoing packet is larger than that of the first outgoing packet.

20. The method of claim 19, wherein the first and second outgoing packets are Point-to-Point Protocol over Ethernet (PPPoE) frames.

21. The method of claim 20, wherein the incoming packet is an Internet Protocol (IP) packet and the header of the incoming packet is the IP header of the incoming IP packet.

22. The method of claim 19, further comprising:
 generating a first outgoing sub-header according to a header of the incoming packet and the predetermined portion of the payload stored in the storage unit;
 generating a second outgoing sub-header according to the header of the incoming packet or the first outgoing sub-header, and the remaining portion of the payload;
 including the first outgoing sub-header and the predetermined portion of the payload stored in the storage unit in the first outgoing packet; and
 including the second outgoing sub-header and the remaining portion of the payload stored in the storage unit in the second outgoing packet.

23. The method of claim 19, wherein the first outgoing packet is stored in a single storage unit of the computer memory of the gateway device and the second outgoing packet is stored in a plurality of storage units of the computer memory of the gateway device, wherein as soon as all data stored in a respective storage unit is transmitted, the respective storage unit is freed for other uses by the gateway device.

* * * * *